United States Patent [19]

Tsuyoshi et al.

[11] Patent Number: 4,949,325
[45] Date of Patent: Aug. 14, 1990

[54] METHOD AND ASSOCIATED APPARATUS AND MEDIUM FOR OPTICAL RECORDING AND REPRODUCING INFORMATION

[75] Inventors: Toshiaki Tsuyoshi, Hachioji; Masatoshi Ohtake, Ome; Wasao Takasugi, Higashiyamato; Seiji Yonezawa, Hachioji; Takashi Takeuchi, Fujisawa; Tadashi Saitoh, Fujisawa, all of Japan

[73] Assignee: Hitachi, Ltd., Tokyo, Japan

[21] Appl. No.: 169,597

[22] Filed: Mar. 17, 1988

[30] Foreign Application Priority Data

Mar. 18, 1987 [JP] Japan .................................. 62-61023

[51] Int. Cl.$^5$ .......................... G11B 7/00; G11B 27/10
[52] U.S. Cl. ...................................... 369/49; 369/47; 369/124
[58] Field of Search ...................... 369/47, 49, 124, 48

[56] References Cited

U.S. PATENT DOCUMENTS

| | | | |
|---|---|---|---|
| 4,122,501 | 10/1978 | Sardello et al. | 360/51 |
| 4,561,082 | 12/1985 | Gerard et al. | 369/45 |
| 4,712,204 | 12/1987 | Takemura et al. | 369/47 |
| 4,730,294 | 3/1988 | Funada | 369/124 |

OTHER PUBLICATIONS

*Fast Digital Phase-Locked Oscillator,* Cukier, IBM Technical Disclosure Bulletin, 8/84, pp. 1463-4.
Sector Servo Data File Optical Disk Memory, Yonezawa et al., SPIE, vol. 529, 1985.
Servo and Clock Sampling in the Optimem 1000, Miller et al., SPIE, vol. 529, 1985.

*Primary Examiner*—Steven L. Stephan
*Attorney, Agent, or Firm*—Antonelli, Terry, Stout & Kraus

[57] ABSTRACT

In a method of recording/reproducing information associated with an apparatus and recording medium, the medium has an alternate formation including tracks of first regions wherein at least an optical record of preformatted pits at a constant time interval is recorded and second regions in which information is recorded so that optical retrieval can be achieved. A clock signal is generated based on the readout signal of the preformatted pits to record an information signal in the second regions, and the clock signal is retarded and used to read out data pits that are the record of the information in the second regions.

13 Claims, 18 Drawing Sheets

FIG. 1 PRIOR ART
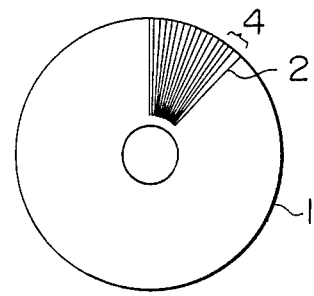

FIG. 2B S1 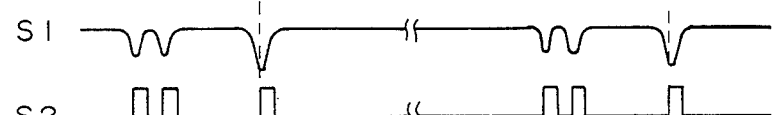
FIG. 2C S2 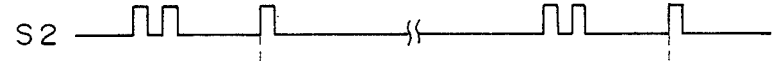
FIG. 2D S3 
FIG. 2E S4 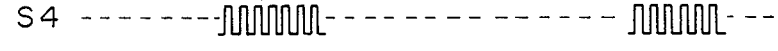

METHOD AND ASSOCIATED APPARATUS AND MEDIUM FOR OPTICAL RECORDING AND REPRODUCING INFORMATION

BACKGROUND OF THE INVENTION

The present invention relates to an information recording and reproducing method based on a sampled servo system for a recording medium on which servo areas and data areas are formed alternately along tracks, wherein information is written and read out in the data areas using a light beam while the tracking control takes place in response to the servo signal retrieved intermittently from the servo areas, and more particularly to an information recording and reproduction method based on sampled clocking in which a clock signal is produced from the signal preformatted in the servo areas and information is written and read out in accordance with the clock signal. The invention also relates to an apparatus for carrying out this method and to a recording medium on which information is written and read out on the basis of this method.

Generally, conventional CD (Compact Disc) players and optical disk file units have been controlled for light spot tracking and focusing according to a continuous servo system. Recently, a different optical disk file system based on sampled value control has been proposed (which hereinafter will be termed "sampled servo system"). This system will first be explained briefly on FIGS. 1 and 2A-2B. In FIG. 1, an optical disk 1 of sampled servo system has its tracks each partitioned into segments 4 of 1000-2000 in number, and each servo segment 4 is divided into a servo area 2 and data area 3 as shown in FIG. 2A. Accordingly, the optical disk has on its information recording surface an alternate disposition of servo areas and data areas on each circular track. In the sampled servo system, the tracking signal is produced from a pair of wobbled pits 5 formed on both sides of the track center 7 within the servo area 2, and a clock signal is produced from a clock pit 6 formed at the track center 7 within the servo area 2. These wobbled pits 5 and clock pit 6 are preformatted in the servo area, and they provide an intermittent servo signal and clock signal for use in writing or reading data in the data area 3. Because of the complete separate arrangement for the data area and servo area, which allows the servo signal to be free from the interference of the recording data during the recording or reproducing operation, the sampled servo system is advantageous in having a stable servo system and a simple optical system. The sampled servo system is described in the Japanese periodical "Nikkei Electronics", No. 410, pp. 165-170, published on Dec. 15, 1986.

The sampled clocking system adopted in the sampled servo system will be explained in FIGS. 2 and 3. FIG. 3 shows in block diagram the clocking circuit, and FIG. 2 shows the signals on the timing chart. In operation, as a light beam spot traces the track center 7, an optical sensor (not shown) produces a signal S1 (FIG. 2B) in terms of a change in the reflected light intensity. The signal S1 is fed through a peak detector 10, which then produces a signal S2 (FIG. 2C) indicative of the peak position of S1, i.e., the pit position. The peak detector 10 is realized using a differentiation circuit, for example.

The sampled clocking system resides in the method of dividing the interval of two contiguous clock pits 6 equally into $N_1$ time-slots and placing $N_1$ clock pulses in them. A clock pit extractor 11 is used to pick up from among the signal S1 a signal S3 (FIG. 2D) derived from the clock pit 6, and a PLL (Phase Locked Loop) circuit 12 is used to generate a clock signal S4 with an $N_1$-times frequency and in synchronism with S3. The servo area 2 is given a violation code pattern of modulation for the pit arrangement so that the pits do not appear in the data area 3. The clock pit extractor 11 can be realized in such a manner of pattern matching based on the measurement of the time interval between pits. The PLL circuit 12 has basically the same arrangement as a general frequency synthesizer, including a phase comparator (phase detector) 13, a low-pass filter 14, a VCO (Voltage Controlled Oscillator) 15, and a $1/N_1$ ($N_1$ is an integer) frequency divider 16. The PLL circuit 12 produces the clock signal S4 with a frequency $N_1$ times that of the clock pit pulse signal S3, and the S4 pulses divide one data segment 4 into equal $N_1$ time-slots accurately even in the presence of eccentricity of the disk or fluctuation of the rotation speed.

SUMMARY OF THE INVENTION

The present invention resides in the clocking system for information recording and reproduction based on the sampled servo system, and its main object is to provide an information recording and reproduction method and associated apparatus and recording medium, in which data bits are recorded in the data area in accordance with a clock signal produced from clock pits preformatted in the servo area and the data pits are read out accurately in accordance with the clock signal even in the presence of inconsistency between the position of recorded data pits (post-recorded data pits) and the clock signal caused by the electrical delay in the circuit, the recording material or recording conditions.

The present invention includes a recording medium on which are formed alternately at least first regions having an optical record of preformatted pits for providing a constant time interval and second regions in which information is recorded afterward in such a manner of allowing optical information retrieval using a light beam. The system produces a clock signal from a reproduced signal derived from the preformatted pits, records an information signal in the second regions in accordance with the clock signal, and retrieves the information signal from recorded data pits in the second regions using a clock signal produced, with a certain delay being applied, from the preformatted pit clock signal.

According to one aspect of the present invention, the delay for the readout clock signal is feedback-controlled so that the phase difference between the delayed clock signal and a readout signal derived from recorded data pits is minimal.

According to another aspect of the present invention, phase correction pits (sync pits) are recorded at the head of a data pit string in a data recording process, and the recorded data pits are read out using a readout clock signal which is delayed from the preformatted pit clock signal to the extent that the phase difference detected between the reproduced phase correction pit signal and the preformatted pit clock signal is minimal. In the case of using the readout data pit signal for the phase comparison with the preformatted pit clock signal, it is necessary that the clock component be included in all or part of the reproduced waveform of the data pit signal.

The inventive method cancels the phase difference between the post-recorded data pits and preformatted pits by retarding the preformatted pit clock signal in reading out the data pits recorded in the second regions, whereby the reliability of data pit readout is enhanced and the compatibility between the recording-reproduction apparatus and the recording media is also improved.

BRIEF DESCRIPTION OF THE DRAWINGS

FIG. 1 is a diagram showing a known segment arrangement on the optical disk of a sampled servo system;

FIGS. 2A to 2E are timing diagrams for explaining the sampled clocking system;

DESCRIPTION OF THE PREFERRED EMBODIMENTS

Before entering into the explanation of embodiments of this invention, problems of sampled clocking system that the present invention is intended to solve will be described. The sampled clocking system is designed to record and read out data pits in second recording regions using a clock signal produced from preformatted pits in first recording regions. Problems arising in this operation will be explained with reference to FIGS. 4A to 4D.

Figure 4:
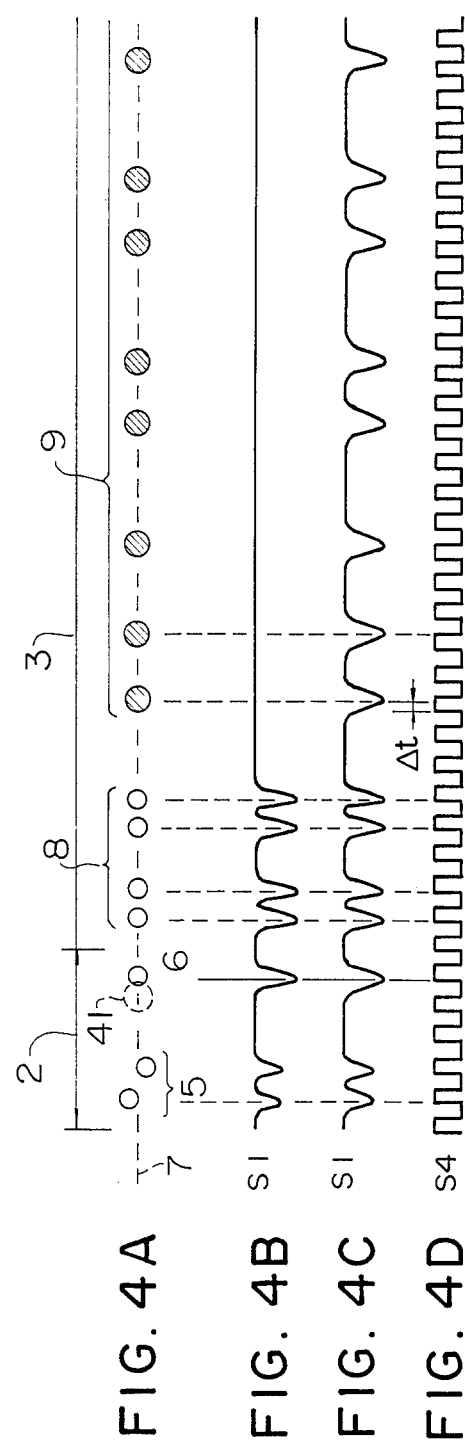
FIGS. 4A to 4D are diagrams used to explain the problems of the sampled clocking system.

FIGS. 4B and 4C show the readout signal waveforms produced when the light spot 41 has traced a track of pit pattern shown in FIG. 4A. FIG. 4B is the waveform of signal S1 before post-recorded data pits 9 have been recorded, and FIG. 4C is the waveform of signal S1' after the post-recorded data pits 9 have been recorded. A pit string indicated by 8 shows preformatted data pits which were formed together with pits 5 and 6 including address information in the servo area 2 when the disk was manufactured. In sampled clocking method, the PLL system operates such that the generated clock signal S4 has its transition (rising edge in this embodiment) being coincident with the peak of the clock pit 6. Since the edge of the clock signal S4 is coincident with the center of the preformatted pits (5, 6, 8), no problems arise when reading out the preformatted data pit string 8. The data pits 9 are recorded using the clock signal S4. When it is intended to write the post-recorded pits 9 at the rising edge of the clock signal S4, the center of actually recorded pits 9 can possibly be retarded by Δt from the rising edge of the clock signal S4. The value of Δt differs depending on the electrical delay in the circuit, the recording material and the recording condition. Accordingly, direct use of the clock signal S4 for reading out the post-recorded data pit string 9 will result in incorrect data reproduction.

The present invention is intended to provide an optical disk file system capable of correct data retrieval even in the presence of time lay Δt of the post-recorded pits from the clock signal.

Figure 5:
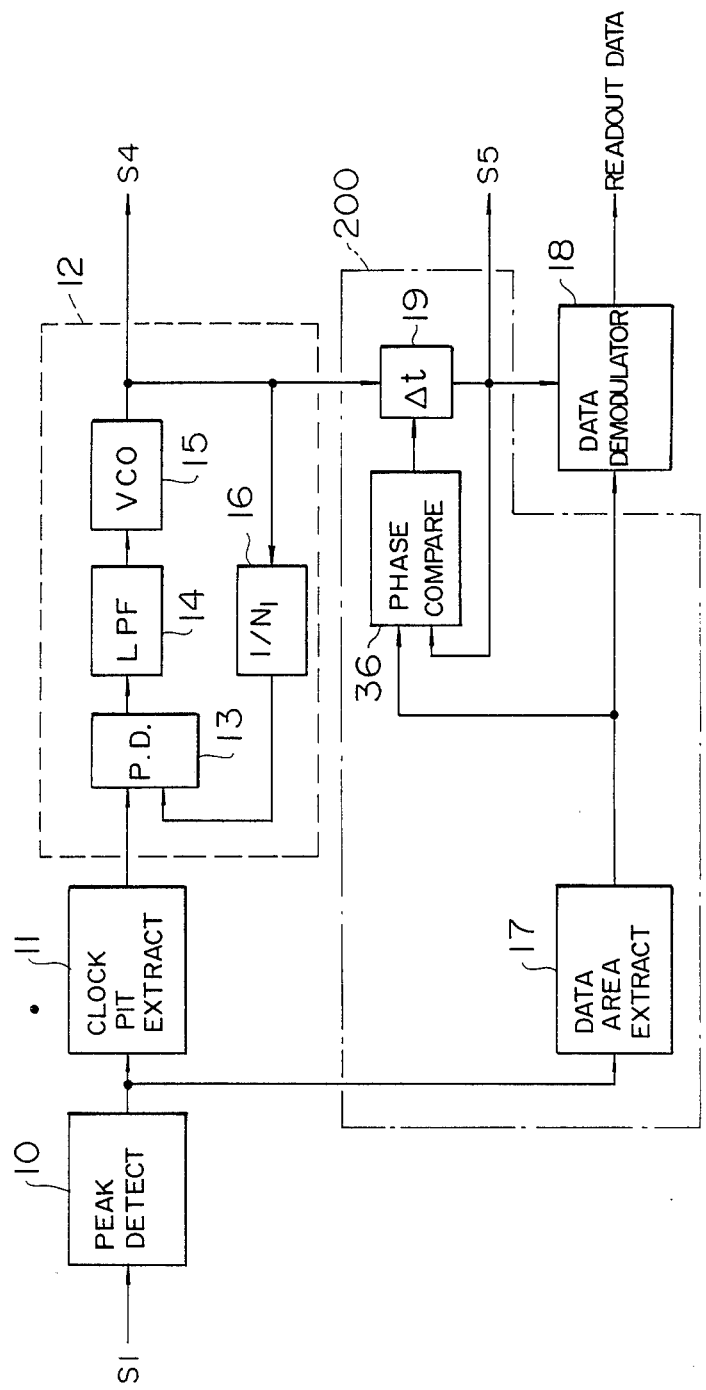
FIG. 5 is a block diagram used to explain the concept of the invention.

FIG. 5 shows in block diagram the concept of the present invention, and it features the addition of a clock generator 200 for handling post-recorded data pits. The clock signal S4 produced from preformatted pits, e.g., clock pits formed in the first regions at manufacturing, is retarded by Δt with a delay circuit 19 to produce a data pit clock signal S5 so that the time difference between the post-recorded data pits and preformatted pits is cancelled. The signal representing the post-recorded data pits 9 is extracted from the readout signal S1 by means of a data area extractor 17, and the pits are demodulated by a data pit demodulator 18 using the clock signal S5. The inventive system does not merely provide a fixed delay for the clock signal, but it implements the feedback control for the extent of delay in such a manner that the phase difference between the post-recorded pits and the delayed clock S5, as detected by a phase comparator 36, is minimal.

Figure 2A:
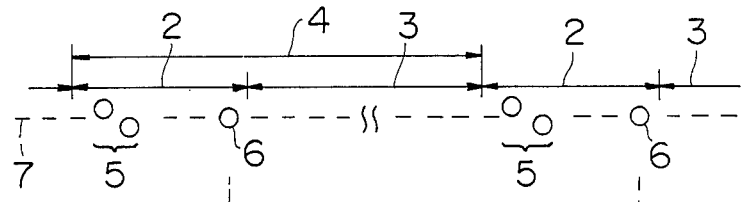
Figure 3:
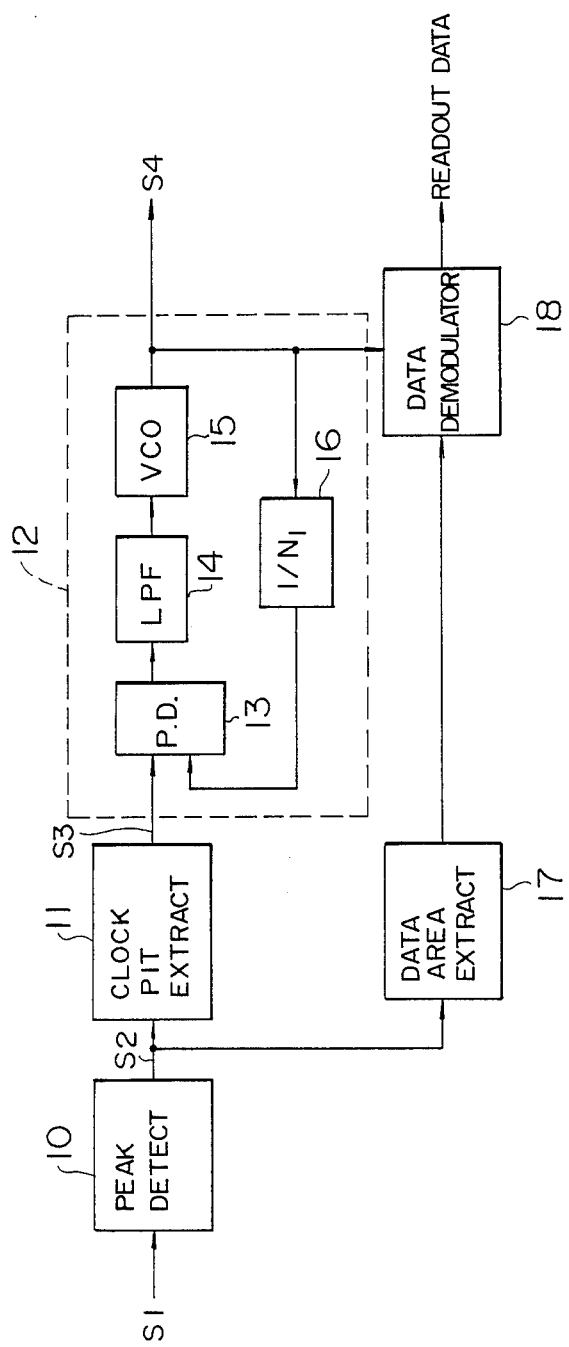
FIG. 3 is a block diagram of the clocking circuit.
Figure 6:
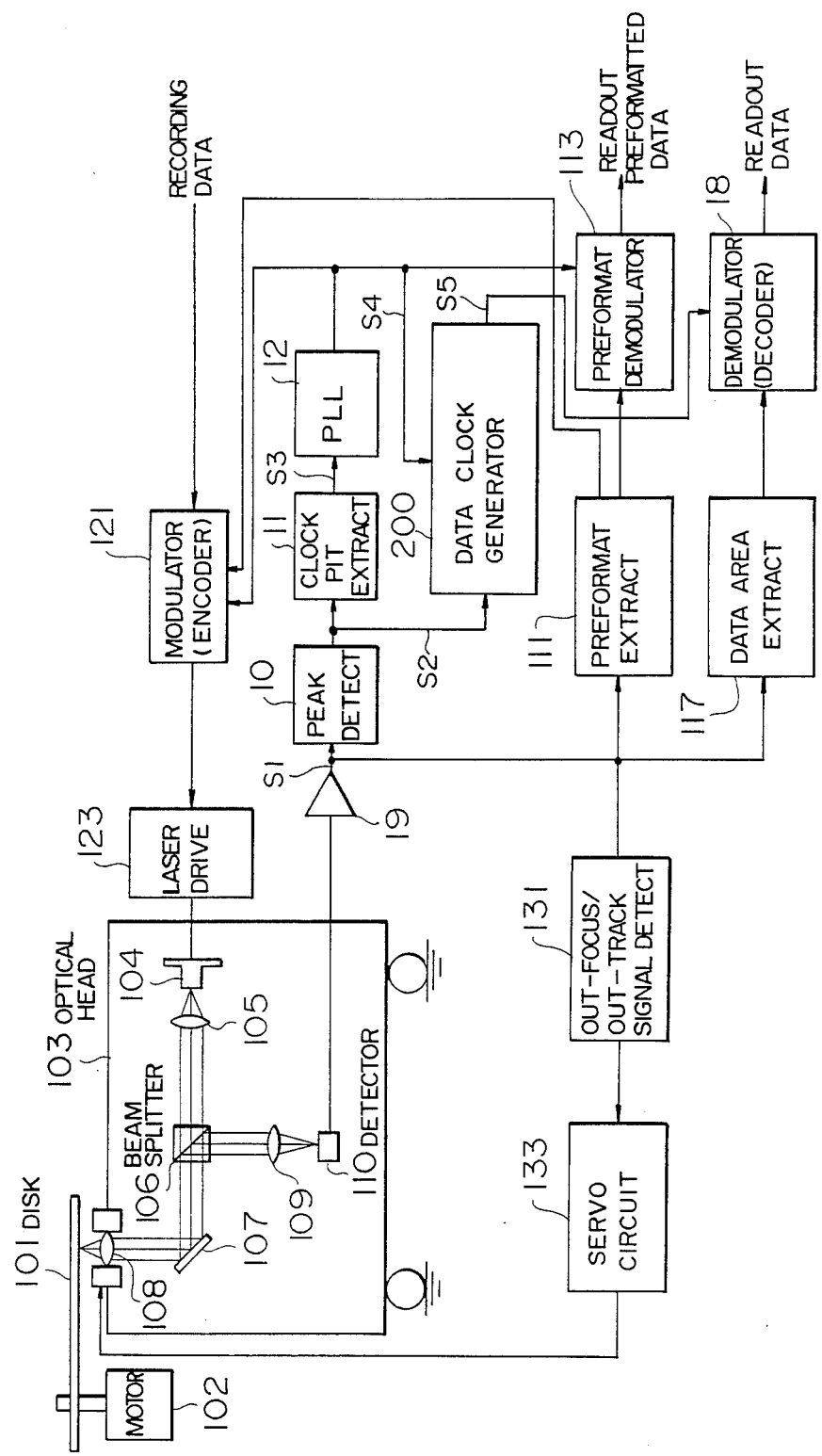
FIG. 6 is a block diagram of the apparatus for carrying out the inventive recording-reproduction method.

FIG. 6 shows the arrangement of the apparatus which carries out the inventive recording-reproduction method. In the figure, a disk 101 is a transparent substrate, for example, with a recording layer being formed thereon, and it is rotated by a motor 102. A light beam from an optical head 103 is focused on the recording layer through the transparent substrate. The optical head 103 is designed to move in the radial direction of the disk 101. On the recording layer of the disk 101, imaginary tracks are formed in a spiral or concentric fashion along the disk circumferential direction. Each track circle is divided into 1000–2000 servo segments 4 as mentioned in the discussion of FIG. 1, and each servo segment 4 consists of a servo area 2 including preformatted wobbled pits 5 and clock pit 6 for tracking and a data area 3 in which data pits are recorded by the light spot, as shown in FIG. 2A. As shown in FIG. 4A, pits 8 such as address information may be preformatted along with the pits 5 and 6 in the servo area 2.

In the optical head 103, the light beam from a laser source, e.g., semiconductor laser source, is collimated with a lens 105, and after going by way of a beam splitter 106 and mirror 107, is projected by an objective lens 108 to form a small light spot on the disk 101. The reflected light beam from the disk 101 is conducted by way of the objective lens 108 and mirror 107, separated from the source beam by the beam splitter 106, converged by a lens 109, and converted into an electrical signal by a photodetector 110. The output of the photodetector 110 is amplified by an amplifier 19, and the readout signal S1 is obtained. The signal S1 is fed to an out-focus/out-track signal detector 131 so that the signal is verified intermittently for out-focusing and out-tracking on the basis of timing when the light spot passes the out-focus and out-track detecting sections within the servo area 2. The detector 131 holds the events of out-focusing and out-tracking to provide a continuous out-focus and out-track signals. For the out-focus detection, a blank region for focusing is provided in the servo area and out-focusing is detected in a sampling fashion, as described in U.S. Pat. No. 4,561,082. Out-tracking is detected by the method using the wobbled pits 5 in the servo area, as described in publication SPIE, Vol. 529, Optical Mass Storage (1985), pp. 84–88 and pp. 140–144. It should be noted that the sampled servo system is less defensive against erroneous sampling caused by defects or the like, and therefore it is preferable to take the measures against erroneous sampling as proposed in U.S. Pat. Application Ser. No. 72,095 filed on Jul. 10, 1987 or U.S. Pat. Application Ser. No. 131,643 filed Dec. 11, 1987 assigned to the present assignee.

The readout signal S1 is converted by a peak detector 10 into a signal S2 which indicates the signal peak position. The signal S2 is fed to a clock pit extractor 11, which extracts the pulse signal S3 representing the clock pit 6, and it is fed to a PLL circuit 12. The PLL circuit 12 produces a clock signal S4 having an $N_1$-times frequency of and in synchronism with S3. The clock signal S4 is supplied to a modulation circuit 121 and used as a clock signal for recording post-recorded data pits. The modulation circuit 121 provides a laser drive 123 with a pulse signal carrying data to be recorded at the timing of the clock signal S4. The laser drive 123 supplies the laser source 104 with a recording pulse current in correspondence to the data, and data pits are formed in the data area 3. The clock signal S4 is also fed to a preformatted section demodulation circuit 113 and used as a clock signal for reading out the preformatted pits. A preformatted section extracting circuit 111 is intended for extracting only signal of preformatted section from the readout signal S1. The extracting circuit 111 also produces a gate signal indicative of the preformatted section, and it is fed to a modulation circuit 121 to inhibit the reception of recording pulses by the laser driver 123 during the period, thereby preventing post-recorded data pits from being recorded in the preformatted section. Although in this embodiment the readout signal S1 is supplied to the preformatted section extracting circuit 111, the output signal S2 of the peak detector 10 can be used when the pit position recording mode, in which information is carried at the pit center, is adopted.

Indicated by 200 is a clock generator for post-recorded data, which cancels the phase lag of post-recorded data pits in the data area 3 from the clock signal S4 by retarding the S4 by $\Delta t$ and produces a clock signal S5 for reading out post-recorded data pits, as will be explained in more detail later. The data area extracting circuit 117 is to extract the readout signal representing the post-recorded data pits 9 from the readout signal S1. The signal S2 may be used when data pits are recorded in pit position mode.

Next, an embodiment of the clock generator 200 for post-recorded data pits will be described with reference to FIG. 7. The data clock generator 200 of this embodiment includes a tapped variable delay element 20, a selector 21, a phase comparator 22, 1/n frequency dividers 23 and 24, and a reversible counter 25. The tapped variable delay element 20 has multiple output taps, e.g. 7 taps in FIG. 7, for delivering outputs with a difference of delay of $\Delta \tau$ between each other. The delay element 20 receives the clock signal S4 provided by the PLL circuit 12 and produces eight kinds of clocks out of phase with each other by $\Delta \tau$, from among which a clock with the best phase matching with the readout signal of post-recorded data pits 9 is selected by the data selector 21 as an output clock signal S5. This embodiment is assumed that data pits 9 are recorded in pit position mode as shown in FIG. 4A and FIG. 4C. The phase comparator 22 is supplied with a pulse signal S6 indicating the peak of the data pits 9 and the clock signal S5 selected by the selector 21, and it compares the phases of both inputs in response to S6. The phase comparator 22 has two output terminals, one providing a pulse output when S6 leads, the other providing a pulse output when S6 lags. The output of the phase comparator 22 is fed to the reversible counter 25, which delivers the count output to the select input of the data selector 21. Accordingly, the count of the reversible counter 25 varies depending on the output of the phase comparator 22, i.e., lead or lag, and consequently the phase of clock signal S5 selected by the data selector 21 varies. Frequency dividers 23 and 24 located between the phase comparator 22 and reversible counter 25 serve as low-pass filters so that they produce a single pulse output upon receiving consecutive leading or lagging pulses of n in number. This circuit arrangement prevents the clock signal S5 from varying too sensitively in response to the noise. The functional blocks 23 and 24 are not confined to the frequency dividers, but they may be circuits each providing an output on receiving a certain number of consecutive pulses with the same polarity (lead or lag).

Figure 8A:
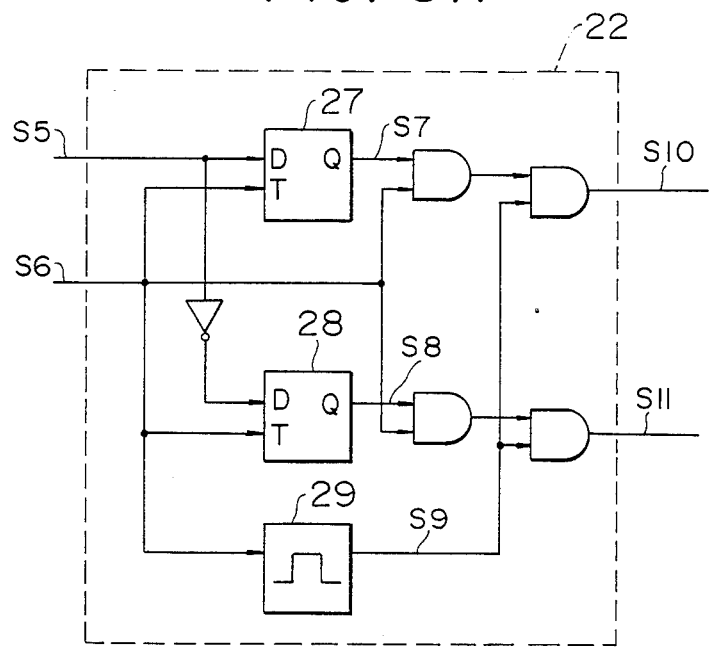
FIGS. 8A to 8C are diagrams used to explain the arrangement and operation of the phase comparator.
Figure 8B:
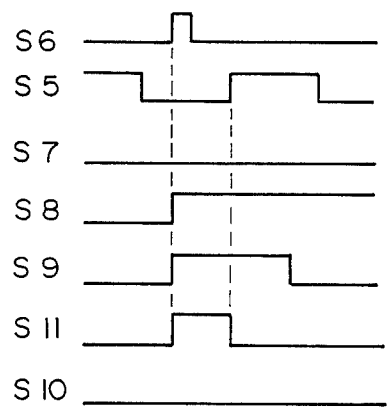
Figure 8C:
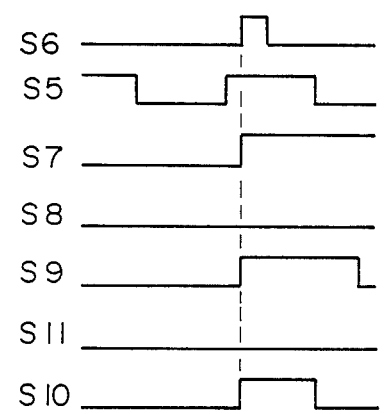

FIG. 8A shows an example of the phase comparator 22, and it includes D-type flip-flops 27 and 28, a monostable multivibrator 29 and AND gates. FIGS. 8B and 8C explain the operation of this circuit on the timing charts for the case of leading clock S5 against data pit pulses S6 and the case of lagging clock S5, with output pulses S11 and S10 being produced, respectively. The monostable multivibrator 29 is set to have an output pulse width which is longer than a half period and shorter than a period.

The foregoing first embodiment of the invention is capable of precise phase matching through the provision of the delay element 20 having a smaller phase step $\Delta \tau$. It is also possible to preset the reversible counter 25 to select a standard delay so that the phase control settles down in a shorter time. Frequent presetting is not needed, but it will take place when the disk is replaced or immediately after the disk is accessed.

Figure 7:
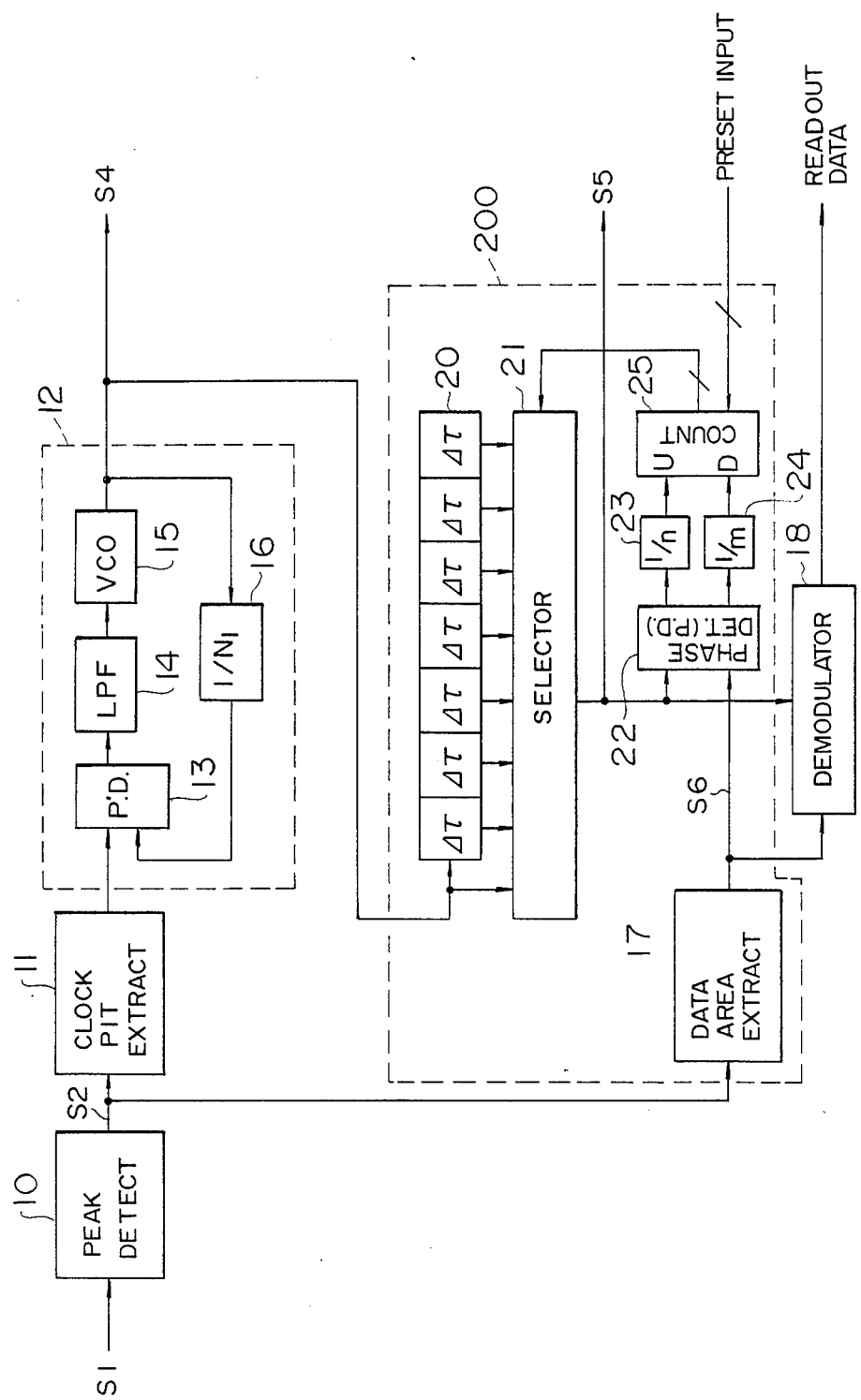
FIG. 7 is a block diagram used to explain the data clock generator embodying the present invention.
Figure 9:
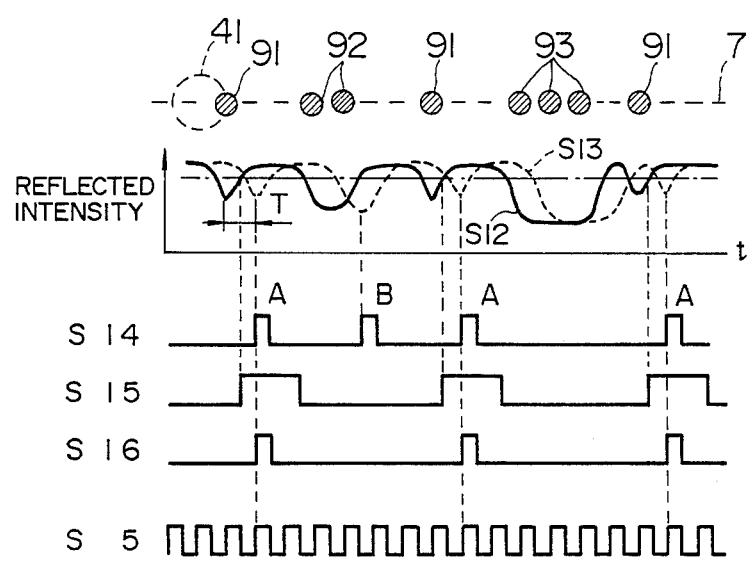
FIGS. 9 and 10 are a waveform diagram and block diagram showing a modified embodiment derived from FIG. 7 operating in a different modulation mode.

The embodiment of FIG. 7 is of the case of the modulation mode in which the recording pit interval on the optical disk is greater than the beam spot diameter. In contrast, FIG. 9 shows an embodiment of the case of the recording mode in which the data pit interval is smaller than the diameter of beam spot 41, i.e., a modulation mode in which individual pits appear unresolute in the readout signal S1 (S14). The 4–15 modulation is an example of this modulation system. FIG. 9 shows at the top the recording of post-recorded data pits 91–93 on the track center line 7, where 91 denotes a single pit, 92 denotes double pits and 93 denotes triple pits. This embodiment is intended for the case in which such contiguous pits as 92 and 93 are unresolute in the reproduced signal as shown by S12 (solid line). For reading these data pit strings, the reading clock signal S5 needs to have the transition edge at the center of each pit.

Figure 10:
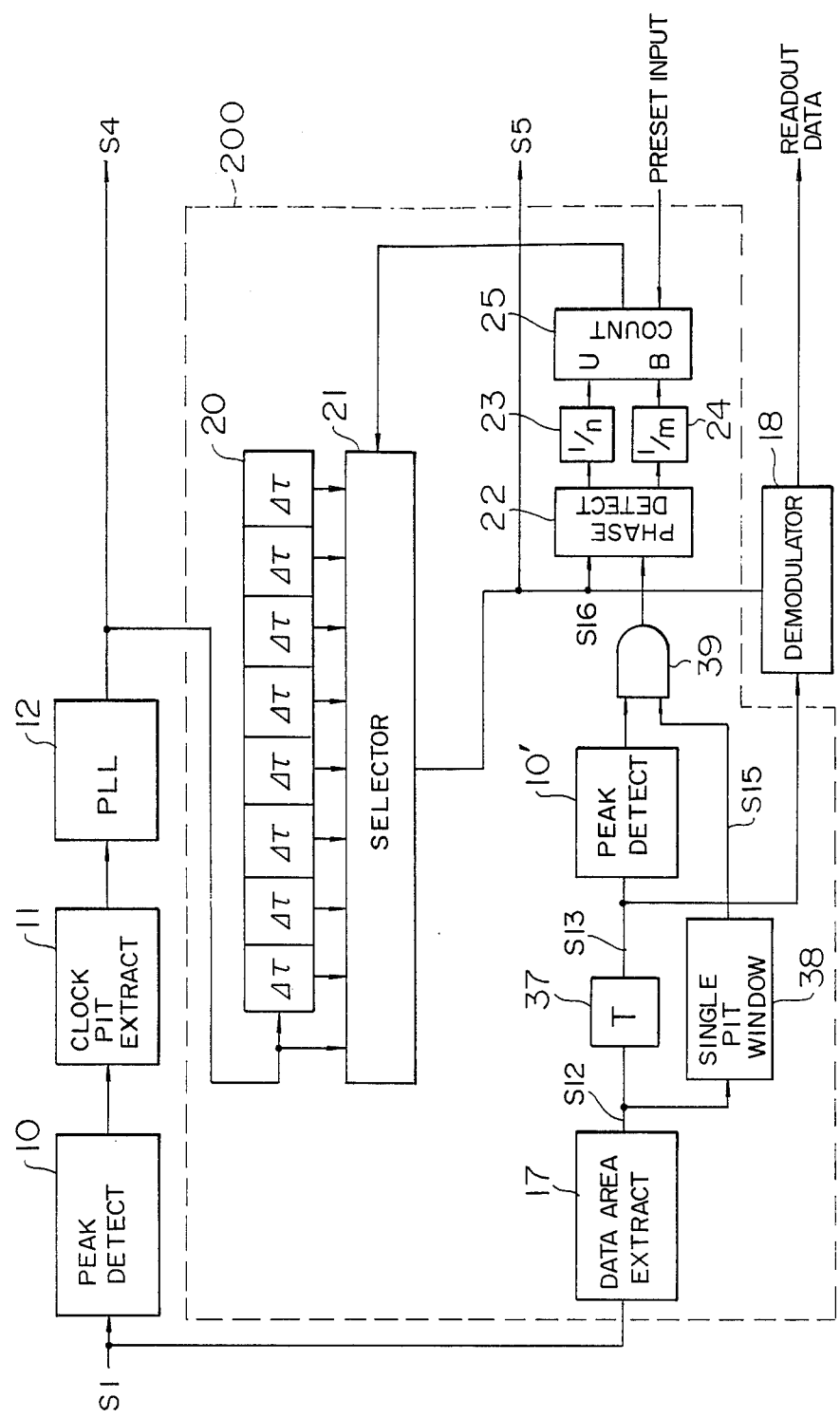

FIG. 10 shows in block diagram the circuit arrangement for producing a correct data clock signal S5 from the above pit strings. This embodiment is basically the same as that of FIG. 7 and differs in the addition of a function for selecting only the single pit 91, which makes clock extraction easy, from the readout waveform S12. The following describes the operation of this embodiment on the timing chart of FIG. 9.

The analog readout signal S12 which is the result of extraction of data area by the data area extractor 17 is retarded by T with a delay element 37. The time length T is set long enough to identify a pit to be a single pit 91, and it is generally around 1-2 clock periods. The delayed signal S13 is subjected to peak detection by a peak detector 10', resulting in a digital signal S14. Although the signal S14 includes the peak (B) of double pits besides the peak (A) of single pits, the peak (B) is located at the middle of contiguous pits and has a different phase from the peak (A). Therefore, contiguous pits are not suited for clock generation, and only the peak of single pit 91 is selected by a single pit window generator 38. A method of selection is that the signal S12 is made binary at a certain threshold level, and the waveform is determined to be a single pit when the resulting pulse width is smaller than a certain width. The single pit recognition is followed by the generation of a window pulse S15. The signals S14 and S15 are gated with an AND gate 39, resulting in a signal S16 which solely indicates the peak of single pit. The signal S16 is fed to the phase comparator 22 as in the case of FIG. 7, and a clock signal S5 in-phase with post-recorded pits is produced. The demodulator 18 has its data input supplied from the output of the delay element 37.

Figure 11:
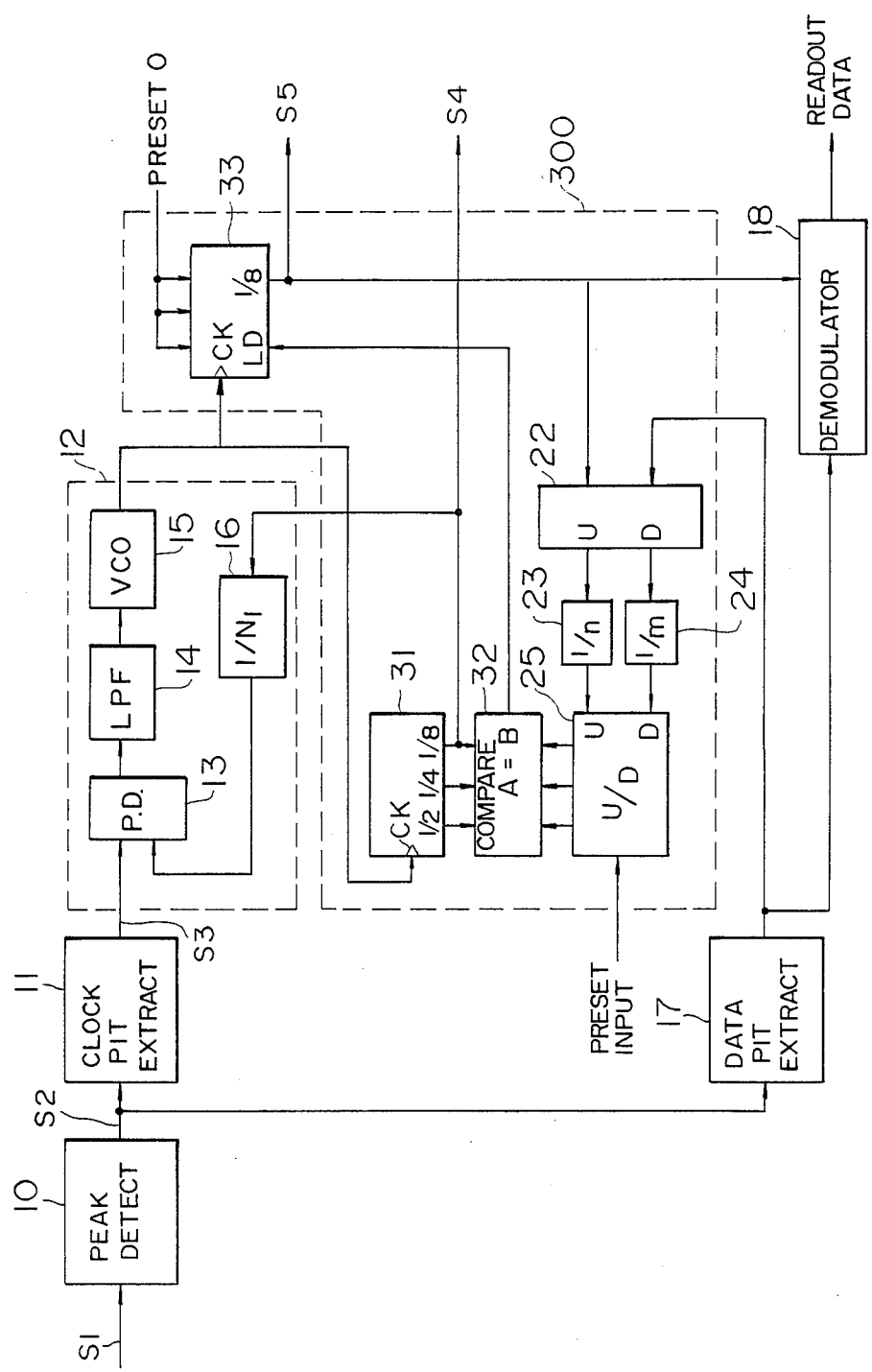
FIG. 11 is a block diagram showing another embodiment of the data clock generator.

Next, another embodiment of the data clock generator will be described with reference to FIG. 11. This arrangement does not include the delay element 20 in contrast to the preceding embodiments of FIG. 7 and FIG. 10, but operates to generate with a PLL circuit a clock $N_2$ times the intended clock frequency and count down $1/N_2$ with a counter to select an optimal count output from among $N_2$ kinds of phases based on the count-down timing. $N_2$ is set to 8 in the example of FIG. 11. Indicated by 300 in FIG. 11 is the data clock generator, and it is made up of a phase comparator 22, frequency dividers 23 and 24 and a reversible counter 25, as in the embodiments of FIGS. 7 and 10, and further includes a digital comparator 32 and counters 33 and 31. The VCO 15 generates a clock eight times the intended frequency and supplies it to the 3-bit counter 31. A resulting $\frac{1}{8}$-frequency derivative S4 is fed back to the $1/N_1$ frequency divider 16 in the PLL circuit 12 and also used for reading the preformatted pits. The 3-bit outputs or $\frac{1}{2}$, $\frac{1}{4}$ and $\frac{1}{8}$-frequency derivatives from the counter 31 are fed to the digital comparator 32, which compares them with the 3-bit outputs of the reversible counter 25 and produces a pulse output when the each pair of inputs are equal. The clock signal generated by the VCO 15 is also supplied to the counter 33, which divides its frequency by eight to produce the intended clock signal S5. The 3-bit counter 33 is preset to "000" upon receiving a pulse on the load terminal from the comparator 32, and it starts counting. Namely, the arrangement of FIG. 11 is designed to select a phase by basing the count-down timing of an 8-fold clock on the output of comparator 32. The operation of the phase comparator is the same as the preceding embodiments. The reversible counter 25 may be preset to meet a standard phase difference between S4 and S5 so that the pull-in time is minimized. This circuit arrangement does not include a delay element and offers less manufacturing cost. An increased number of phases for selection, such as 16 or 33, is of course possible, other than the above example of eight phases.

Figure 12:
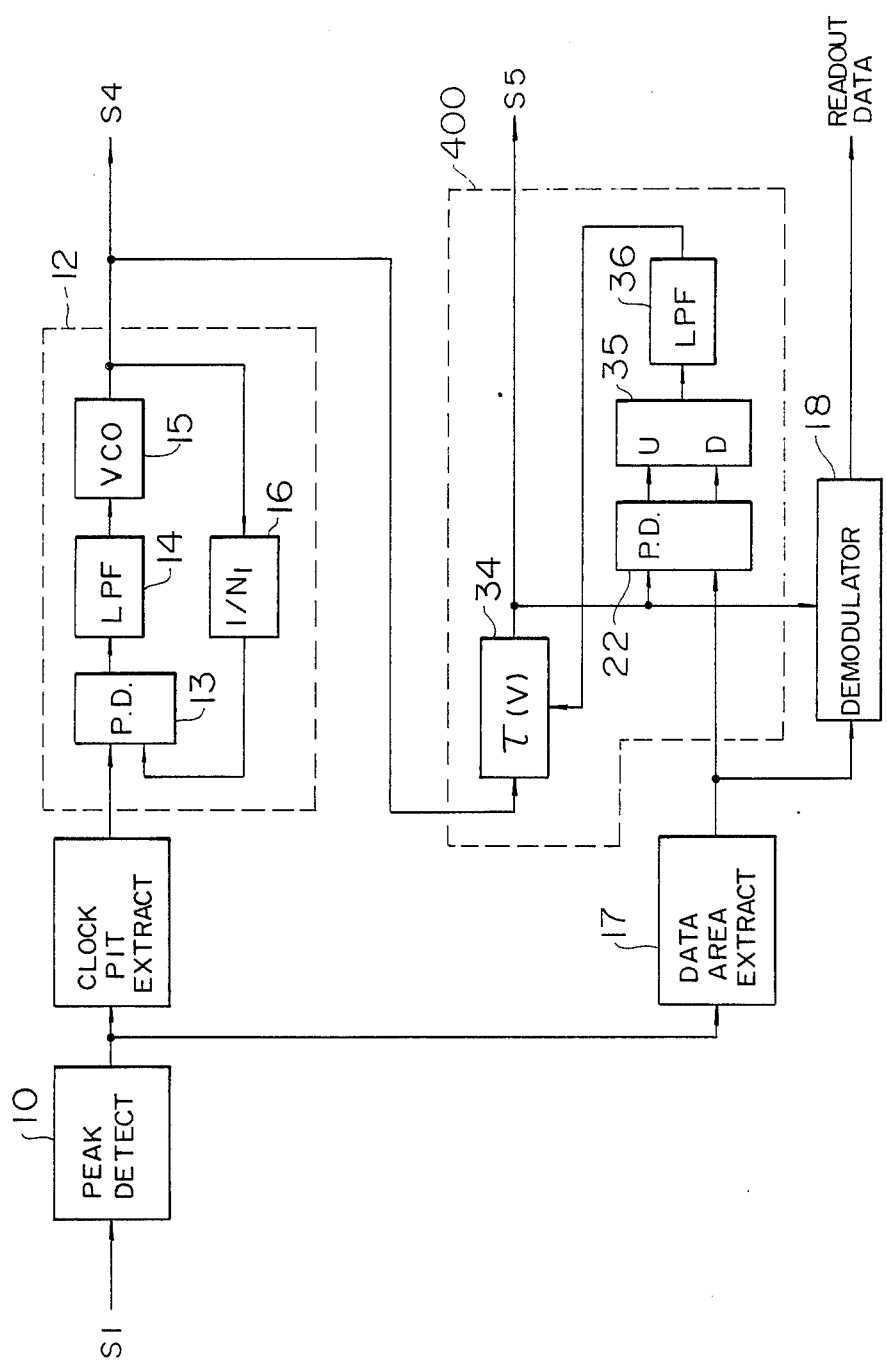
FIG. 12 is a block diagram used to explain still another embodiment of the data clock generator.

FIG. 12 shows in block diagram still another circuit arrangement of the data clock generator. The arrangement employs a voltage-controlled delay element 34 which creates a continuously variable delay. The clock generator 400 operates to compare the phases of the output S5 from the voltage-controlled delay element 34 and the readout signal of post-recorded data pits with a phase comparator 22, and supplies the comparison output to a charge pump 35 so that it produces an analog signal with a positive or negative polarity for a leading or lagging phase. The analog output signal from 35 is rid of harmonic components with a low-pass filter 36 and used as a control voltage for the variable delay element 34, and a control system for adjusting the clock retardation depending on the phase difference is established. Preferably, the voltage-controlled delay element has its operating point (center value) set to meet a standard retardation. The ability of continuous variation of delay based on this circuit arrangement enables much precise phase matching. It is possible for the clock generators 300 and 400 shown in FIGS. 11 and 12 to be modified to operate in the modulation mode shown in FIG. 9.

In the foregoing embodiments, the phase lag of the readout signal for post-recorded data pits is detected to modify the phase of data clock S5, with a standard retardation being preset so that the initial phase adjustment for S5 settles in a short time. By recording a short training area or a sync pattern (one pit or a few pits) for initial delay adjustment at the head of each data sector in recording data pits, the phase difference between the signals is detected and minimized by the timing operation, whereby the reliability of reading out post-recorded data pits can be enhanced.

Figure 13:
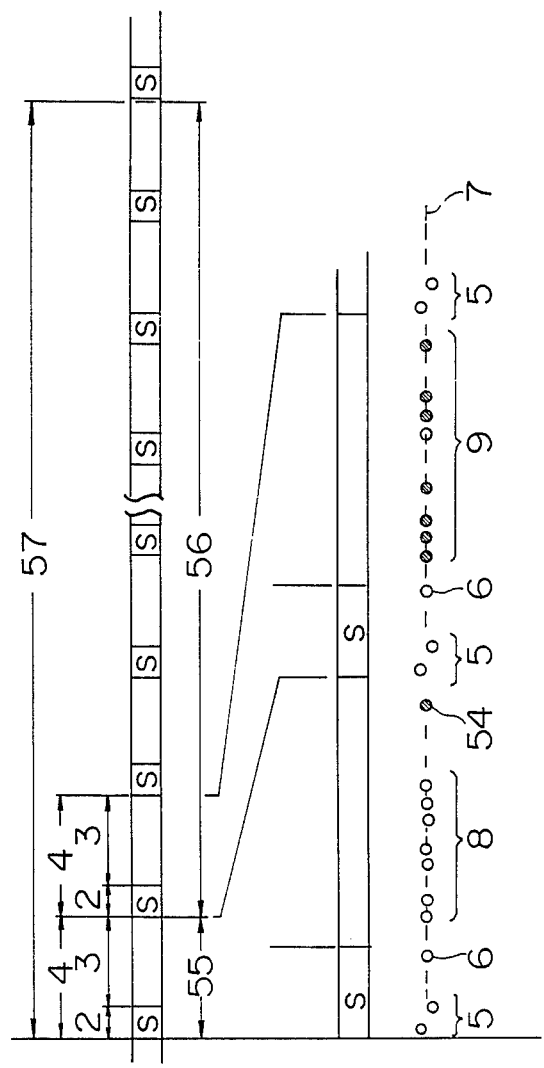
FIG. 13 is a diagram used to explain a track of phase correction pits recorded on the inventive recording medium.

FIG. 13 shows, as an example, the arrangement of the recording track. In the sampled servo system, servo segments 4 of 10-100 in number are grouped to form a data read-write unit, i.e., a data sector 57, and the data area 3 in the leading servo segment 55 is designated as a header block in which header information 8 such as the sector address is preformatted. Data areas 3 in the remaining region 56 in the second (or third) and following servo segments are assigned to the user's data recording area. In this track arrangement, when data pits 9 are recorded in each data area 3 in the region 56, a post-recorded synchronizing (sync) pit 54, e.g., as shown by hatching in the data area 3 of the leading servo segment 55 in the data sector 57, is written prior to the recording of post-recorded data pits 9. At data retrieval, the readout signal of the post-recorded sync pit 54 is used to detect the phase difference from the clock signal S4 and produce the clock signal S5 such that the phase difference is cancelled, and post-recorded data pits 9 are demodulated on the basis of the clock signal S5.

Figure 14:
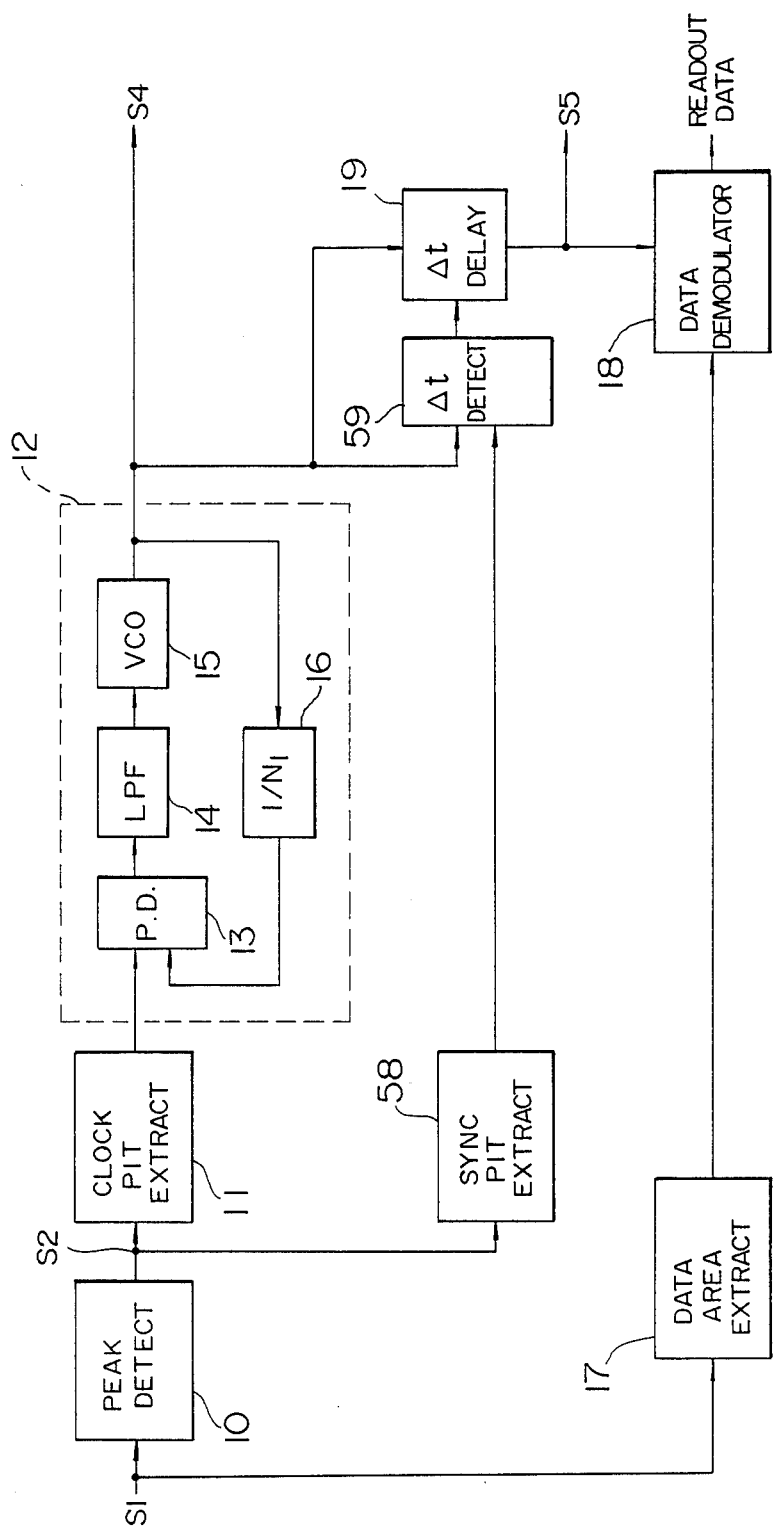
FIG. 14 is a block diagram used to explain a further embodiment of the data clock generator.

FIG. 14 is a block diagram of the circuit arrangement for carrying out the above signal timing control. The post-recorded sync pit 54 is predetermined to be recorded at the end of the header, and it can be extracted from the signal S2 following peak detection by a sync pit extracter 58. A phase difference detector 59 detects the phase difference Δt of the sampled clock signal S4 from the time point when the post-recorded sync pit 54 arises and operates on a variable delay element 19 to adjust the phase of the clock signal S4 so that the phase difference is minimal, and consequently a clock signal S5 which is in-phase with the following post-recorded data pits 9 is produced. Using this clock signal S5 for the demodulation of post-recorded data pits achieves reliable data reproduction.

The operation of the circuit arrangement of FIG. 14 will be described in more detail with reference to the block diagram of FIG. 15 and the timing chart of FIG. 16. The sampled clock signal S4 is produced from the readout signal S1 in the same manner as the preceding case of FIG. 7. The clock signal S4 is fed to the delay element 20, which then produces multiple clocks S21 with a phase differential step $\Delta\tau$, and the one of S21 that is best in-phase with post-recorded data pits is selected by a selector 21 to produce the data pit clock signal S5. A sync window generator 50 and associated AND gate 51 are used for the detection of readout timing for the post-recorded sync pit. The illustrated arrangement is to select a phase from among eight different phases. The signal S23 timed to the post-recorded sync pit loads a latch register 52 with eight clocks of different phases. A decoder 53 receives the outputs S22 of the latch register 52 to determine as to which one of clocks has a phase closest to the phase of post-recorded sync pit. The relevant clock is selected by the selector 21 and used as the data pit clock S5 for demodulating the data signal.

Figure 16:
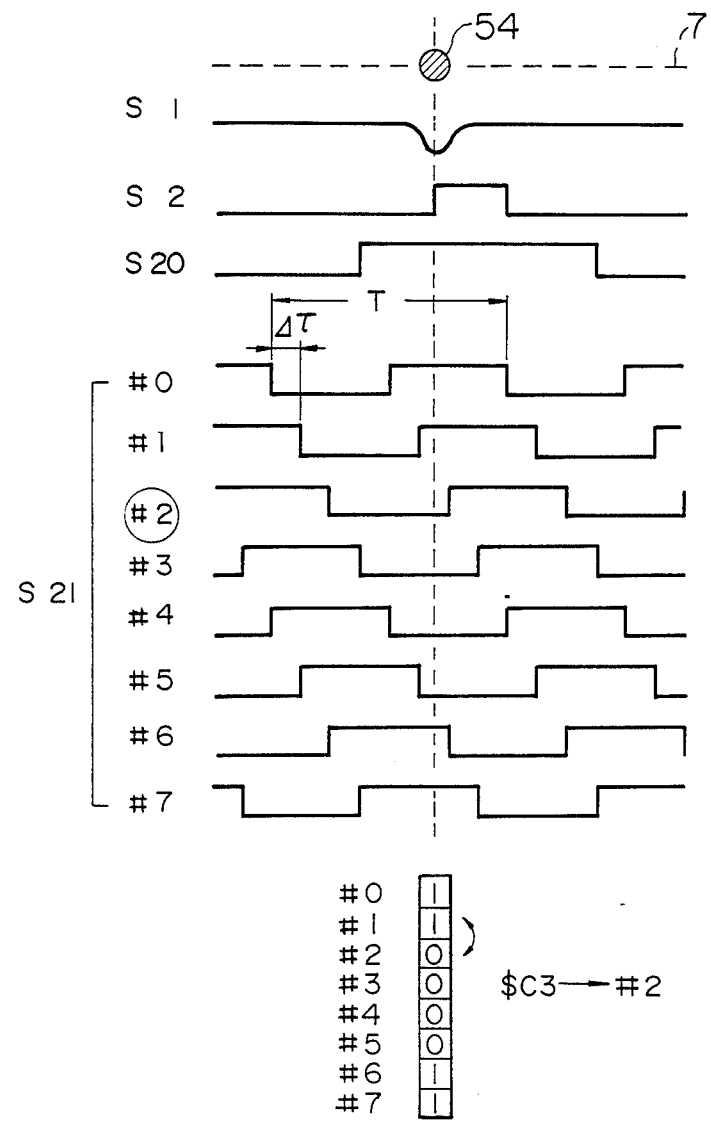
FIG. 16 is a timing chart associated with FIG. 15.

On the timing chart of FIG. 16, waveforms #0–#7 are the outputs S21 of the delay element 20, and in this case they are out of phase between each other by $\Delta\tau$ which is ⅛ of the period T. It is assumed that the post-recorded sync pit 54 has appeared at a time point shown at the top of FIG. 16. Although the sync pit 54 is depicted smaller, it actually has a size comparable with the period T on the time base.

The center of the pit 54 is detected by a peak detector 10, and its signal is fed through the sync pit window 50 to the clock terminal of the latch register 52. The latch register 52 responds to the rising edge of the signal S23 to hold the states of eight clocks, e.g., "11000011", or "C3" in hexadecimal notation, for the #0–#7. In this example, the post-recorded pit string has its phase closest to the phase of clock #1 or #2. As an assumption, the circuit is designed to select the latter clock of "0" at the transition from "1" to "0" in the latch register 52. The contents of latch register 52 are entered to the decoder 53 and it produces "011" in correspondence to #2 in the timing relationship of FIG. 16. The output of the decoder 53 is fed to the selector 21, which selects a clock with the phase of #2, and this clock S5 is used for the demodulation of data. It is not always necessary for the clocks #0–#7 to have a 50% duty cycle, nor have they got to be equal divisions of the period T. For example, in case of the phase difference Δt ranging smaller relative to T, the range of $\Delta\tau$ can be divided appropriately.

Figure 15:
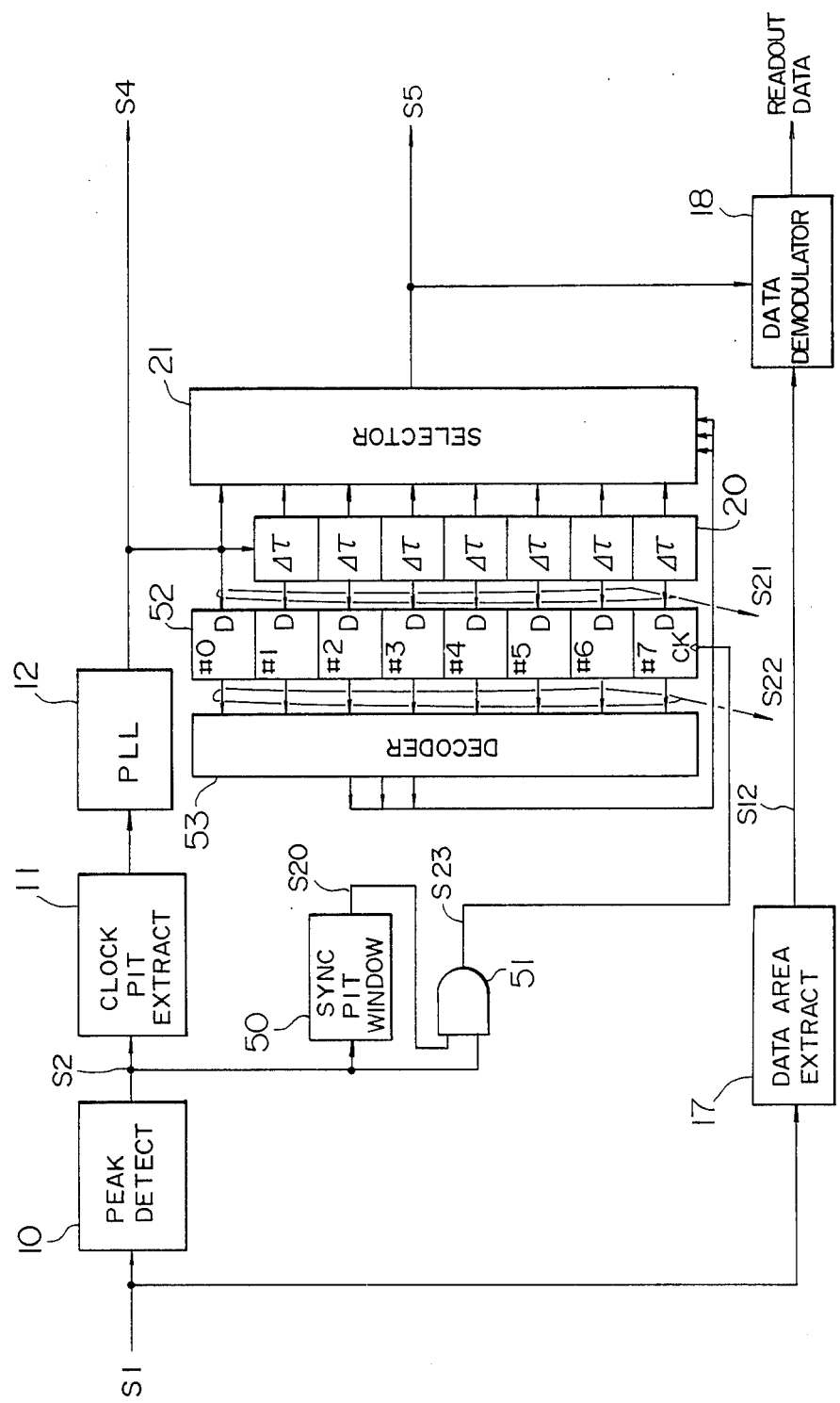
FIG. 15 is a detailed block diagram associated with FIG. 14.
Figure 17:
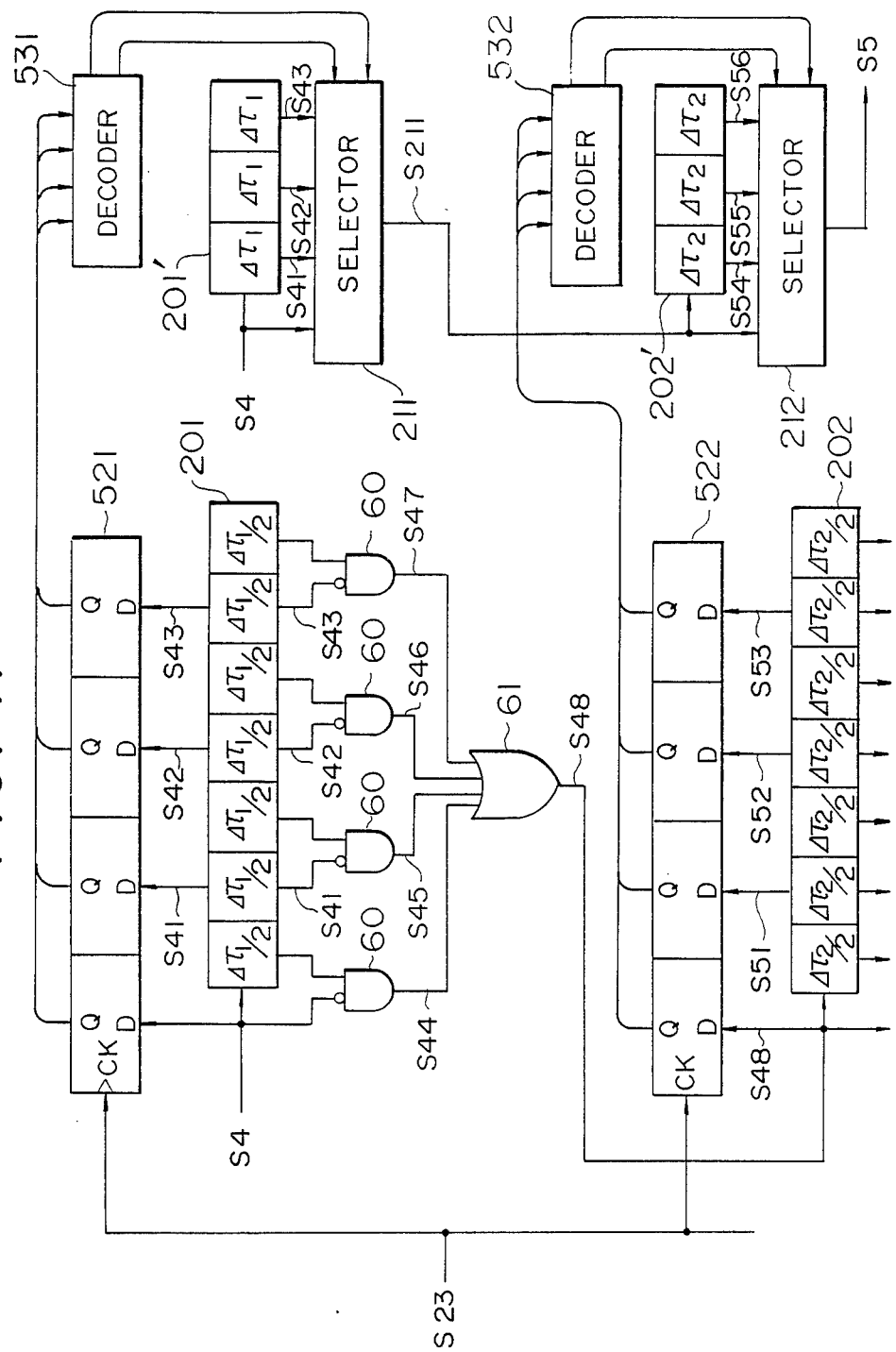
FIG. 17 is a more detailed block diagram derived from FIG. 15.
Figure 18:
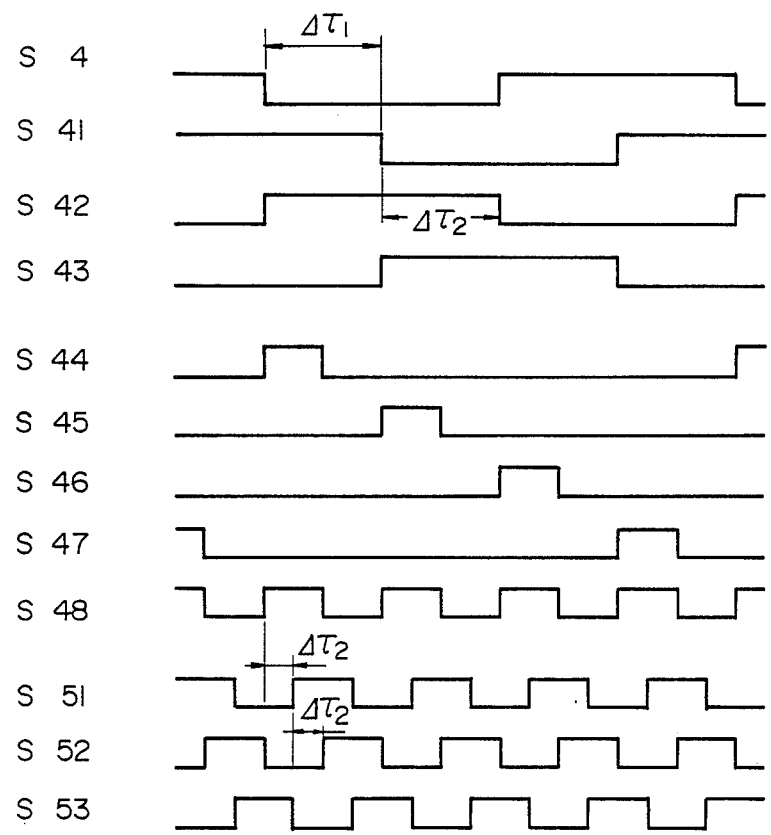
FIG. 18 is a timing chart used to explain the circuit arrangement of FIG. 17.

FIG. 17 shows a modified circuit arrangement derived from FIG. 15, and FIG. 18 is an associated timing chart. Although this example is basically the same as the preceding one, it employs multiple delay elements in hierarchical configuration, allowing the phase measurement in finer resolution in the entire range of T. The operation will be described on these figures.

The inputs to the circuit are the clock signal S4 provided by the PLL system and the signal S23 indicating the timing of the peak of post-recorded sync pit, and the output of the circuit is the signal S5 which has been retarded depending on the phase shift of post-recorded pits, as in the case of FIG. 15. The clock signal S4 is fed to a latch register 521 and a delay element 201, and phase shift information is held in response to the signal S23, as in the case of FIG. 15. This circuit arrangement has a parameter of $\Delta\tau = T/4$, as an example, so that the latch register 521 measures the phase shift at an accuracy of T/4. The delay element 201 is designed to apply delays in $\Delta\tau_1/2$ steps to the signal S4, and adjoining ones of the resulting outputs are paired to take AND operations, with one of each pair being inverted, and the AND gates produce four signals S44–S47 having a period of T and a pulse width of $\Delta\tau_1/2$. The four signals are added together by an OR gate 61, which then produces a signal S48 having a period of $T/4 = \Delta\tau_1$. Namely, a signal with a frequency four times the input frequency is produced by the delay element 201 and logic gates 60 and 61. Subsequently, the signal S48 is fed to a delay element 202 having a parameter of $\Delta\tau_2 = \Delta\tau_1/4 = T/16$, and it produces three signals S51–S53. These signals are held by a latch register 522 in response to the timing signal S23 which is common to the latch register 521, and the phase shift information with a $\Delta\tau_2$ accuracy is held in the latch register 522. Accordingly, for the phase shift information of post-recorded pits, the latch register 521 holds high-order bits and the latch register 522 holds low-order bits, and both registers in unison perform the phase shift measurement at a T/16 accuracy in the entire range of T. Specifically, the outputs of the register 521 are decoded by a decoder 531, and a clock signal S211 with a phase shift to be modified in the $\Delta\tau_1$ accuracy is selected by a selector 211, as in the case of FIG. 15. The signal S211 is fed to a delay element 202' having $\Delta\tau_2$ steps. The phase shift information with a $\Delta\tau_2$ accuracy held in the latch register 522 is decoded by a decoder 532, and depending on its output value a signal is selected from among four signals S211 and S54–S56 which are derived in $\Delta\tau_2$ delay steps from the clock S211 modified at a $\Delta\tau_1$ level. The selected signal S5 is a clock having a $\Delta\tau_2$ accuracy with its phase shift value being modified at an accuracy of T/16. This embodiment can readily enhance the measuring accuracy by increasing hierarchical levels of delay element, and is also advantageous for the integrated fabrication owing to its pure digital circuit configuration.

It is not always necessary for the optimal clock selection to check all bits of the latch register, but it is sufficient to detect the position of transition from consecutive "0"s to "1" (or reverse transition) in the contents of latch register Accordingly, the decoder 53 can be replaced with a commonly used ROM (Read Only Memory). In this case, arbitrary output setting can be made to all combinations of the latch register contents, and it becomes possible to cope with error in the latch register contents A distinct feature of this example is the capability of phase matching independent of the modulation mode of information, in contrast to the example of FIG. 7.

Figure 19:
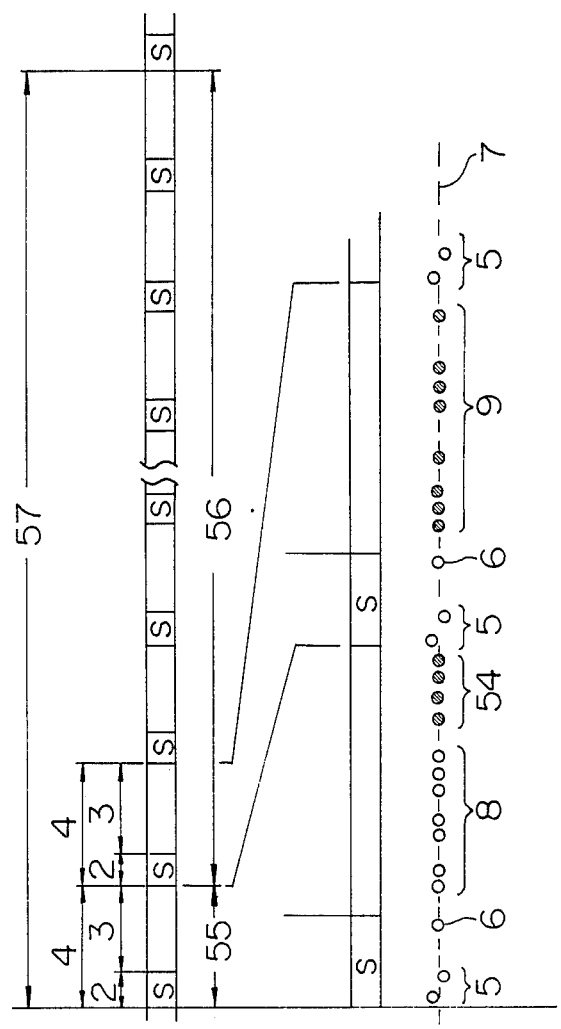
FIG. 19 is a diagram showing a track format of the inventive recording medium with the provision of multiple phase correction pits.

Although the foregoing examples are the cases of a single post-recorded sync pit 54, as shown in FIG. 19, multiple (n) sync pits may preferably be used to implement the phase selection n times more so that a clock with the most frequently selected phase is produced, thereby further enhancing the reliability.

Furthermore, it is also possible to provide multiple (n) post-recorded sync pits, and a clock with a correct phase is selected solely in the period of n sync pits through the feedback modification by means of the reversible counter, as described on FIGS. 7, 10, 11 and 12.

Although in the foregoing examples the post-recorded recorded sync pit is placed at the head of each sector, it is also possible to place the sync pit at the head of each segment at a cost of decreased data recording capacity, and the process is completely identical to the foregoing cases.

We claim:

1. A method of recording and reproducing an information signal on a recording layer of a recording medium based on a first clock signal produced in response to a readout signal of preformatted pits on the recording layer, comprising the steps of:

extracting at least a portion of a signal which has been recorded on the medium at information recording, said extracted signal portion comprising an extracted signal;

generating a data processing clock signal based on the difference in phase between said extracted signal and said first clock signal so that the difference in phase between said data processing clock signal and said extracted signal is minimal; and demodulating the information signal based on said data processing clock signal.

2. An information signal recording and reproducing method according to claim 1, wherein said extracted signal comprises said information signal.

3. An information signal recording and reproducing method according to claim 1, wherein said extracted signal comprises a synchronizing signal for post recording which has been recorded in advance of said information signal at information recording.

4. An information recording and reproducing apparatus for recording and reproducing information on a recording medium according to the method set forth in claim 1, said apparatus comprising irradiation means for projecting a beam of radiation to said recording medium; means for producing said first clock signal in response to said readout signal of preformatted pits on said recording medium; means for recording said information signal on said recording medium based on said first clock signal; means for applying a certain delay to said first clock signal in order to produce a retarded clock signal; means for controlling the length of said delay by detecting the difference in phase between said retarded clock signal and a readout signal derived from at least part of said information signal so that the phase difference between said retarded clock signal and said readout signal derived from at least part of said information signal is minimal; and means for reading out said information signal based on said retarded clock signal.

5. An information medium for recording and reproducing information according to the method set forth in claim 1, said information medium having an alternate arrangement in tracks of first regions wherein an optical record of preformatted pits in a constant interval on the time base is formed and second regions wherein said information signal is recorded so that optical retrieval using a beam of radiation is allowed, part of said second regions being designated as a recording region for synchronizing information which is recorded in advance of recording said information signal at the time of information recording.

6. A method of recording and reproducing an information signal on a recording medium on which are formed alternately in tracks first regions including at least an initial optical record of preformatted pits at a constant interval on the time base and second regions in which an information signal is recorded in such a manner of allowing optical retrieval using a light beam, said method comprising the steps of:

generating a clock signal based on a readout signal of said preformatted pits;

recording the information signal in said second regions based on said clock signal;

retarding said clock signal by a certain time length; and reading out the information signal from said second regions using said retarded clock signal.

7. An information signal recording and reproducing method according to claim 6, wherein said clock retardation is feedback-controlled by detecting the difference in phase between said retarded clock signal and a readout signal of at least part of the information signal retrieved from said second regions, so that the phase difference is minimal.

8. An information signal recording and reproducing method according to claim 7, wherein synchronizing information is recorded in at least one of said second regions in advance of recording an information signal at information recording, and a readout signal of said synchronizing information is used as said readout signal of at least part of the information signal recorded in said second regions.

9. An information recording and reproducing apparatus for recording and reproducing information on a recording medium according to the method set forth in claim 6, said apparatus comprising irradiation means for projecting a beam of radiation to said recording medium; means for producing said first clock signal in response to said readout signal of preformatted pits on said recording medium; means for recording said information signal on said recording medium based on said first clock signal; means for applying a certain delay to said first clock signal in order to produce a retarded clock signal; means for controlling the length of said delay by detecting the difference in phase between said retarded clock signal and a readout signal derived from at least part of said information signal so that the phase difference between said retarded clock signal and said readout signal derived from at least part of said information signal is minimal; and means for reading out said information signal based on said retarded clock signal.

10. An information medium for recording and reproducing information according to the method set forth in claim 6, said information medium having an alternate arrangement in tracks of first regions wherein an optical record of preformatted pits in a constant interval on the time base is formed and second regions wherein said information signal is recorded so that optical retrieval using a beam of radiation is allowed, part of said second regions being designated as a recording region for synchronizing information which is recorded in advance of recording said information signal at the time of information recording.

11. A method of recording and reproducing an information signal on a recording layer of a recording medium based on a first clock signal produced in response to a readout signal of preformatted pits on the recording layer, comprising the steps of:

generating a data processing clock signal by delaying said first clock signal so that the difference in phase between said data processing clock signal and at least a portion of a signal corresponding to a signal which has been recorded on said recording medium at information recording is minimal; and demodulating the information signal based on said data processing clock signal.

12. A method of recording and reproducing an information signal on a recording layer of a recording medium based on a first clock signal produced in response to a readout signal corresponding to preformatted pits on the recording layer, said method comprising the steps of:

feeding said first clock signal to a delay element that produces multiple clocks, each of said clocks differing in phase from an adjacent clock by a differential phase step;

loading a latch register with clocks of different phases in response to a signal that is timed to a sync pit recorded on said recording medium;

determining which one of the clocks loaded in the latch register has a phase closest to the phase of the sync pit;

selecting one of the clocks produced by said delay element in accordance with the determination of which one of the clocks loaded in the latch register has a phase closest to the phase of the sync pit; and demodulating said information signal based on said selected clock.

13. A method of recording and reproducing an information signal on a recording layer of a recording medium based on a first clock signal produced in response to a readout signal corresponding to preformatted pits on the recording layer, said method comprising the steps of:

feeding said first clock signal into a first circuit, said first circuit comprising a first latch register for holding high-order bits, a first delay element, and a plurality of logic elements;

converting said first clock signal in said first circuit into a second clock signal to be output by said first circuit, said second clock signal having a higher frequency than said first clock signal;

feeding said second clock signal into a second circuit, said second circuit comprising a second latch register for holding low-order bits and a second delay element;

selecting a third clock signal from among said first clock signal and delayed versions of said first clock signal based on decoded outputs of said first latch register;

selecting a fourth clock signal from among said third clock signal and delayed versions of said third clock signal based on decoded outputs of said second latch register; and demodulating said information signal based on said fourth signal.

* * * * *